July 23, 1968          A. O. LEE          3,394,243
MAGNETICALLY SUPPORTED ELECTRIC CRANKCASE HEATING DEVICE
Filed Feb. 4, 1966
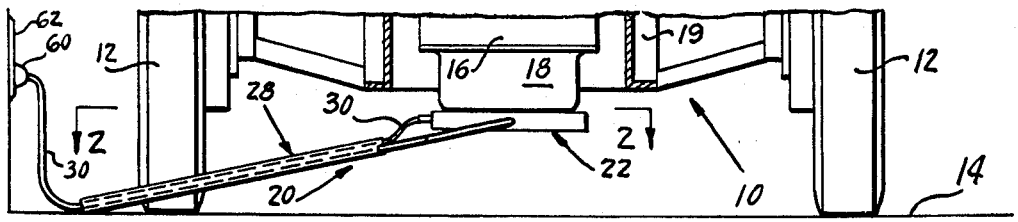
FIG. 1
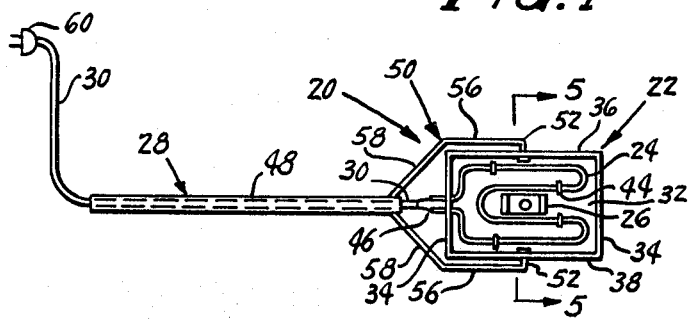
FIG. 2
FIG. 3
FIG. 7
FIG. 4
FIG. 6
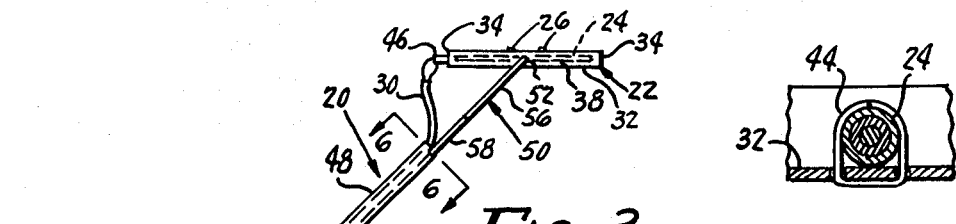
FIG. 5
FIG. 8
INVENTOR.
ALTON O. LEE
BY *Kimmel, Crowell & Weaver*
ATTORNEYS.

United States Patent Office 3,394,243
Patented July 23, 1968

3,394,243
MAGNETICALLY SUPPORTED ELECTRIC CRANKCASE HEATING DEVICE
Alton O. Lee, Box 158, West Glacier, Mont. 59936
Filed Feb. 4, 1966, Ser. No. 525,016
6 Claims. (Cl. 219—205)

ABSTRACT OF THE DISCLOSURE

A frame housing an electric heating element is releasably held against the bottom of a motor vehicle crankcase by a magnet. An elongated handle has one end pivotally attached to the frame so that the device may be positioned against the crankcase without getting under the vehicle. Locking means, operable from the other handle end, are provided so that the frame can be oriented relative to the handle for easy attachment to the crankcase. After attachment the locking means is released so that the other end of the handle can be lowered to engage the surface on which vehicle rests.

---

This invention relates to portable heating devices, and more particularly to such a device which may be releasably attached to the crankcase of a motor vehicle for warming the oil contained therein to facilitate engine starting on cold mornings.

As conducive to an understanding of the instant invention, it should be pointed out at this time that the prior art discloses heaters which may be magnetically attached to the crankcase of a vehicle engine for warming the oil contained therein, examples of which may be found in United States Patents 2,507,213 and 3,194,944. The crankcase heating devices of the prior art are apparently designed to be utilized with a vehicle having an engine, the crankcase of which is readily accessible from the hood. Since the only vehicles in which the crankcase is readily accessible from the hood have in-line six cylinder engines and since the vast majority of vehicles on the market today are equipped with V-8 or opposed cylinder configurations, it will be apparent that the prior art devices have limited utility. Aggravating the accessibility of the crankcase from the hood is that a large number of automobiles are equipped with accessories, such as power steering, power brakes, air conditioners and the like, that utilize the entire usable area under the hood.

In accordance with the principles of the instant invention, a heating device is provided with an elongate handle such that the individual may insert the heating element adjacent the crankcase from under the vehicle. A difficulty inherent in an ordinary handle is that the magnetic attaching means must be sufficiently strong to resist the moment produced by the handle that extends beyond the confines of the automobile. It has been found that the use of a pivoted handle allows the individual to place the heating element on the crankcase and then pivot the handle such that a large portion of its weight is supported by the ground surface. By using a pivoted handle it is possible to select a magnet strong enough to carry the weight of the heating element and the unsupported weight of the handle, whereas the use of a fixed handle requires a magnet so large that the entire device would be impracticable. In addition, the instant invention provides a locking arrangement whereby the heating element and the handle may be held in a predetermined relationship to attach the element to the crankcase, after which the locking arrangement may be released to allow the handle to rest on the ground surface.

It is accordingly a primary object of the instant invention to provide a portable device for heating the crankcase of a motor vehicle in which a heating element is provided with a releasable holding means and a handle, the handle being pivotally connected to the heating element.

Another object of the instant invention is to provide a heating device in which a positioning handle is pivotally connected to a heating element with means being provided to selectively lock the heating element and the handle in a predetermined relation.

Still another object of the instant invention is to provide a crankcase heating device of the character described which may be easily and inexpensively manufactured, which is durable, long-lasting and maintenance free, and which is readily adapted for convenient use.

A more specific object of the instant invention is to provide a heating element for a motor vehicle crankcase in which the handle includes means slidably receiving the electrical cord such that the cord may be pulled to align the heating element and handle in a predetermined relation.

Other objects and advantages of the instant invention reside in the combinations of elements, arrangements of parts, and features of construction and utilization, all as will be more fully pointed out hereinafter and disclosed in the accompanying drawing wherein there is shown a preferred embodiment of this inventive concept.

In the drawings:

FIGURE 1 is a view of the heating element of the instant invention operatively associated with the crankcase of a vehicle, certain parts being broken away for clarity of illustration;

FIGURE 2 is a top plan view of the heating element of the instant invention, as may be seen from along line 2—2 of FIGURE 1;

FIGURE 3 is a side elevational view of the heating device of the instant invention illustrating the pivotal nature of the handle;

FIGURE 4 is an end elevational view of the heating device of the instant invention;

FIGURE 5 is an enlarged transverse cross sectional view of the device of the instant invention taken substantially along line 5—5 of FIGURE 2 as viewed in the direction of the arrows;

FIGURE 6 is a transverse cross sectional view of the handle of the instant invention taken substantially along line 6—6 of FIGURE 3;

FIGURE 7 is an enlarged cross-sectional view of one form of connection between the heating element and the frame; and FIGURE 8 is another form of construction showing the connection between the heating element and the frame.

Referring now to the drawing in detail, wherein like reference characters designate like elements throughout the several views thereof, there is indicated generally at 10 a motor vehicle of a conventional type having a plurality of wheels 12 resting on a supporting surface 14 with the customary engine 16 and depending crankcase 18 being positioned intermediate wheels 12 by a supporting framework 19. The heating device of the instant invention is illustrated generally at 20 and has as its major components a frame shown generally at 22 housing a resistance wire 24 configured as a heating element, a magnet 26 for releasably securing frame 22 to crankcase 18, a handle denominated generally at 28 pivotally connected to frame 22 and an electrical cord 30 for delivering electrical energy to heating element 24.

Frame 22 includes a metallic bottom wall 32, a pair of upstanding end walls 34, a pair of side walls 36, 38 and a pair of inwardly extending flanges 40, 42 providing a heat reflecting receptacle for heating element 24. As may be seen from FIGURES 2 and 5, heating element 24 is disposed with the receptacle formed by frame 22 and is secured thereto by a plurality of U-shaped fasteners 44 with the heating wires exiting from frame 22 at an electrical connection 46 where heating element 24 makes contact with electrical cord 30. Since heating element 24 is of the Calrod type, it will be apparent that no insulation is needed between it and metal bottom wall 32. In the event that an ordinary electrical resistor is used, it will be apparent that it should be insulated from bottom wall 32 in a conventional manner.

As seen best in FIGURE 5, magnet 26 is secured to bottom wall 32 of frame 22 by a fastener 47 which is illustrated as a bolt with the upper surface of magnet 26 extending above the plane formed by flanges 40, 42. Although magnet 26 is illustrated as a permanent U-shaped magnet disposed at the geometric center of bottom wall 32, it should be understood that an electromagnet or permanent magnet of any other configuration may be provided.

Handle 28 includes a tubular section 48 pivotally connected to frame 22 by a bail shown generally at 50. Bail 50 includes two substantially mirror image components each of which is provided with a first section 52 extending through side walls 36, 38 of frame 22 and having a boss 54 on the end thereof. It will be seen that first sections 52 and bosses 54 secure bail 50 to frame 22 and provide for pivotal movement therebetween. It should also be noted that first sections 52 are aligned and lie in a transverse plane extending through the center of gravity of frame 22 to provide balance and to facilitate the control of the pivotal movement of frame 22 by electrical cord 30, as will be explained more fully hereinafter.

Each mirror image component of bail 50 also includes a substantially straight second section positioned at right angles with respect to first section 52 and extending toward tubular section 48. Fixedly interconnecting second sections 56 and tubular section 48 is a pair of diagonal braces 58, as may be seen most clearly in FIGURE 2. An important feature in the relationship between frame 22 and handle 28 is that electrical connection 46 is positioned on frame 22 at the intersection of an imaginary line drawn through tubular section 48. Since electrical cord 30 is slidably positioned interiorly of tubular section 48, it will be apparent that the individual may grasp tubular section 48 with one hand and the free end of cord 30, by which is meant the end of cord 30 adjacent to male plug 60, and pull the cord to rotate frame 22 into a coplanar relationship with respect to handle 28. For ease and convenience of manufacture, it should be evident that bosses 54 may be eliminated if braces 58 are designed to bias first section 52 inwardly to secure frame 22 to bail 50.

In the utilization of heating device 20, an individual may grasp handle 28 with one hand and the free end of electrical cord 30 with the other and pull on cord 30 to position frame 22 substantially coplanar with respect to handle 28. The individual may then bend down and extend heating device 20 under automobile 10 such that magnet 26 will become affixed to the bottom of crankcase 18. The individual may then release the free end of cord 30 and slowly rotate handle 28 downwardly until the lower end thereof contacts ground surface 14. Male plug 60 of cord 30 will then be inserted into a suitable electrical receptacle 62 to deliver electrical energy to heating element 24. In the event that automobile 10 is placed a great distance from an electrical receptacle, it will be apparent that a suitable extension cord may be used.

It will be apparent that handle 28 is of sufficient length to reach crankcase 18 from either side of automobile 10 or from the front thereof. Although the size of handle 28 may vary, it is customarily on the order of two to four feet in length in order to provide its designated function. Because the lower end of handle 28 rests on the ground surface 14, it will be seen that a substantial portion of the weight thereof will be supported by surface 14 with the remainder of the weight of heating device 20 being supported by magnet 26. It should also be pointed out that the relationship between cord 30 and tubular section 48 of handle 28 acts as a locking mechanism to establish a predetermined relationship between frame 22 and handle 28 which may be changed by releasing cord 30. Referring now to FIGURE 8, a more economical mode of assembly is illustrated wherein flanges 40, 42, fasteners 44 and bosses 54 are omitted with heating element 24 being held in position by extending sections 53 inwardly to overlie heating element 24. It will be apparent that this results in a more economical method of construction.

It is now seen that there is herein provided an improved portable heating device which accomplishes all of the objects and advantages of the instant invention, as well as many advantages of great practical utility and commercial importance.

Since many embodiments may be made of the instant inventive concept, and since many modifications may be made in the embodiment hereinbefore shown and described, it is to be understood that the foregoing is to be interpreted merely as illustrative and not in a limiting sense.

I claim:

1. A portable device for heating the crankcase of a motor vehicle comprising:
   a frame;
   an electric heating element on the frame for warming the crankcase and contents therein;
   a magnet on the frame for releasably securing the heating element to the crankcase;
   an electric cord operably connected to the heating element for delivering electric energy thereto;
   an elongate handle pivotally connected at one end to the frame allowing an individual to place the heating element on the crankcase and allowing the handle to be pivoted to rest on a surface below the crankcase; and
   cooperating means on said handle and said frame and operable from the other end of said handle for selectively locking the frame and the handle in a predetermined relation to facilitate the placement of the heating element on the crankcase and for releasing the locked relationship between the handle and frame to allow the handle to pivot to the resting position.

2. The heating device of claim 1 including means on the handle slidably receiving the cord, the slidable cord receiving means constituting part of the locking means.

3. The heating device of claim 2 wherein the handle is tubular in configuration and the cord extends through the tubular handle, the relation between the cord and tubular handle constitutes the slidable receiving means whereby an individual may pull the free end of the cord to place the frame and handle in the predetermined relation and then release the cord to allow the handle to rotate with respect to the frame.

4. The heating device of claim 3 wherein the pivotal connection between the handle and frame includes a bail pivotally mounted on the frame and fixedly mounted on the handle.

5. The heating device of claim 4 wherein the bail is pivotally mounted on the frame in a plane drawn through the center of gravity of the frame.

6. The heating device of claim 4 including an electrical connection, on the edge of the frame, securing the heating element to the electrical cord, the connection being located on an imaginary extension of the handle.

References Cited

UNITED STATES PATENTS

| | | | |
|---|---|---|---|
| 2,702,335 | 2/1955 | Cordis | 219—205 X |
| 3,194,944 | 7/1965 | Papp | 219—205 |

FOREIGN PATENTS

| | | |
|---|---|---|
| 477,085 | 9/1951 | Canada. |

ANTHONY BARTIS, *Primary Examiner.*